United States Patent [19]

Chun

[11] Patent Number: 5,556,668
[45] Date of Patent: Sep. 17, 1996

US005556668A

[54] RUBBERIZED PAINT COATING PROCESS

[75] Inventor: Jenny W. Y. Chun, Kowloon, Hong Kong

[73] Assignee: Victory Concept Industries, Ltd., Kowloon, Hong Kong

[21] Appl. No.: 502,107

[22] Filed: Jul. 13, 1995

[51] Int. Cl.$^6$ ............................................. B05D 3/02
[52] U.S. Cl. ..................... 427/378; 427/393.5; 427/401; 427/421
[58] Field of Search ................................ 427/378, 393.5, 427/401, 421

[56] References Cited

U.S. PATENT DOCUMENTS

| | | | |
|---|---|---|---|
| 4,735,995 | 4/1988 | Chuttiath | 524/529 X |
| 4,804,693 | 2/1989 | Harvey et al. | 427/393.6 X |
| 5,211,342 | 5/1993 | Hoy et al. | 427/385.5 X |

*Primary Examiner*—Michael Lusignan
*Attorney, Agent, or Firm*—Ostrager, Chong & Flaherty

[57] ABSTRACT

A process for applying a rubberized paint coating to a plastic surface uses a diluent to dilute rubberized paint having a composition of comparatively larger fractions of xylene and cyclohexanone and comparatively smaller fractions of methyl isobutyl ketone (MIBK) and butylcellusolve. The preferred diluent composition is 6.4% methyl isobutyl ketone, 39.1% xylene, 13.4% butylcellosolve, and 41.1% cyclohexanone. A small amount of hardener may also be added for improved results. Drying for about 10 minutes at 35° C. is found to obtain a good rubber finish without degradation of the plastic surface. A wrapping of tissue paper for packaging the rubberized paint coated article is found to avoid dissolving, chipping, scratching, or adhering to the coated surface.

10 Claims, No Drawings

RUBBERIZED PAINT COATING PROCESS

FIELD OF THE INVENTION

This invention generally relates to a method for applying a rubberized paint coating to a plastic article.

BACKGROUND ART

Rubberized paint is commonly applied on plastic elements where it is desirable to have a tactile feel, such as on the keys or buttons of a keyboard or keypad, or to have a shock absorbing surface, such as on a lens cap or the contact surfaces of cameras, binoculars, and other equipment made of plastic. Applying a rubberized paint coating to a small surface area is relatively easy to manage. However, it is quite difficult to apply a rubber finish to a large surface area, particularly for equipment that is to be contantly handled, because the paint after drying tends to chip off under rough handling.

An example of rubberized paint that is currently sold commercially is Daiplacoat™ Soft BV type paint available from Dainichiseika Color and Chemical Manufacturing Co., Ltd., of Tokyo, Japan. For application of a film of about 20 microns thickness to a commonly used plastic such as ABS plastic, the specifications for the rubberized paint include tests for adhesion (Scotch tape test, 100 squares applied to 100 mm$^2$), hardness under point pressure (JIS K-5400 6.14, grade B), resistance to heat (120 hrs. at 60° C.) and humidity (72 hrs. at 95% R.H. and 40° C.), thermal cycles (5 cycles, each for 4 hrs. at −20° C. and 4 hrs. at 60° C.), weathering (500 hrs. on Weather-O-Meter), and blocking (polyethylene sheet with 500 g loading for 24 hrs.). However, it is found that when the paint is applied to a plastic article having a relatively large surface area, such as a telephone handset unit and main body, the performance of the coating in terms of resistance to heat and humidity is only about half of the manufacturer's specification and chipping commonly occurred.

When chipping and poor surface quality occurs, the manufacturer suggests the use of a diluent or paint reducer to dilute the paint before spraying. A diluent recommended by the above-noted manufacturer is called "China Paint 50" reducer, and has a composition of 10% ethyl acetate, 35% methyl isobutyl ketone (MIBK), 25% xylene, 7.5% cellosolve acetate, 2.5% cyclohexanone, and 20% toluene. By spraying several successive coats of diluent-reduced paint, a more stable surface quality should be obtained. However, it is found that even with the use of the manufacturer's recommended diluent, the desired specifications for adhesion, hardness, and resistance to heat and humidity are not fully obtained.

SUMMARY OF THE INVENTION

It is therefore a principal object of the present invention to provide a rubberized paint coating process that can achieve the full performance of manufacturer's specifications for adhesion, hardness, resistance to heat and humidity, thermal cycling, weathering, and blocking in order to obtain a rubber finish of high quality on plastic articles of relatively large surface area.

In accordance with the present invention, a process for applying a rubberized paint coating to a plastic surface comprises the steps of diluting rubberized paint with a diluent having a composition of comparatively larger fractions of xylene and cyclohexanone and comparatively smaller fractions of methyl isobutyl ketone (MIBK) and butylcellusolve, then spraying the diluted paint on the plastic surface in successive coats followed by drying. The preferred diluent composition is 6.4% methyl isobutyl ketone, 39.1% xylene, 13.4% butylcellosolve, and 41.1% cyclohexanone. A small amount of hardener may also be added for improved results. For the drying step, drying for about 10 minutes at 35° C. is found to obtain a good rubber finish without degradation of the plastic surface. A wrapping of tissue paper for packaging the rubberized paint coated article is found to avoid dissolving, chipping, scratching, or adhering to the coated surface.

DETAILED DESCRIPTION OF THE INVENTION

The essence of the present invention is the discovery through much trial and error of a particularly advantageous diluent for rubberized paint which is composed of comparatively larger fractions of xylene and cyclohexanone and comparatively smaller fractions of methyl isobutyl ketone (MIBK) and butylcellusolve. An example of such a diluent is commercially available under the brandname "50 Reducer" from Chiu Lick Hong Company of Tsuen Wan, New Territories, Hong Kong. As compared to the diluent typically recommended by a manufacturer of rubberized paint, this example of the desired diluent has the following specific composition:

| MANUFACTURER'S SUGGESTED DILUENT: | | DILUENT OF THE PRESENT INVENTION: | |
|---|---|---|---|
| ethyl acetate | 10.0% | | |
| methyl isobutyl ketone | 35.0% | methyl isobutyl ketone | 6.4% |
| xylene | 25.0% | xylene | 39.1% |
| cellosolve acetate | 7.5% | butylcellosolve | 13.4% |
| cyclohexanone | 2.5% | cyclohexanone | 41.1% |
| toluene | 20.0% | | |

When diluted in the proportion of 50%/50% of paint to the desired diluent of the present invention, the resulting rubberized paint coating formed to a recommended thickness of about 20 microns on a large-area plastic surface (such as ABS plastic) is found to achieve the full specifications of the manufacturer for rubber finish quality. It is surmised that this advantageous result is obtained by the omission of ethyl acetate and toluene and instead having larger fractions of xylene and cyclohexanone. These components together form about 80% of the composition of the desired diluent. The remainder consists of comparatively smaller fractions of methyl isobutyl ketone and butylcellusolve. As a further process modification, a small amount of hardener may be added to the mixture of rubberized paint and diluent to obtain improved results. An example of such a hardener is Daiplacoat EN-Z Hardener (85% isocyanate (HMDI), 15% ethyl acetate), available from Bestview Engineering Co./Dainichiseika of Unit 807, 8/F, Hing Wai Centre, Tin Wan Praya Road, Aberdeen, Hong Kong. An example of a preferred mixture is 48.8% rubberized paint, 48.8% diluent/reducer, and 2.4% hardener.

It is further found that a modification in drying from the duration and temperature recommended by the manufacturer improves the quality of the finish obtained. The manufacturer of the rubberized paint with reducer typically recommends that the sprayed articles be dried under forced air drying for 20 minutes at 60° C. However, using the rubberized paint with diluent of the present invention, a good rubber finish without degradation of the plastic surface is found to be obtained by forced air drying for about 10 minutes at 35° C.

It is also found that a modification in packaging of the resulting rubber paint coated articles avoids a problem of degradation. Finished plastic articles in commercial sales are typically wrapped in plastic bags before being packaged in boxes. However, it is found that when plastic articles finished with the rubberized paint are packaged in plastic bags, the rubberized paint coating tends to dissolve on prolonged contact with the plastic bags and chip off. If the finished articles are wrapped in paper or corrugated wrap, the hardness of these materials can scratch the surface of the spray-painted articles. On the other hand, if the articles are wrapped in a soft material such as foam sheets, the soft material can become adhered to the paint surface. In accordance with another feature of the present invention, a modified packaging technique of wrapping the rubberized paint coated articles in tissue paper is found to avoid dissolving, chipping, scratching, or adhering to the paint surface.

Although the invention has been described with reference to certain preferred compositions and process parameters, it will be appreciated that variations and modifications thereof may be devised in accordance with the principles disclosed herein. It is intended that the preferred process and such variations and modifications be included within the definition of the invention as given in the following claims.

I claim:

1. A process for applying a rubberized paint coating to a plastic surface comprises the steps of:

diluting rubberized paint with a diluent having a composition of comparatively larger fractions of xylene and cyclohexanone and comparatively smaller fractions of methyl isobutyl ketone (MIBK) and butylcellusolve, spraying the diluted paint on the plastic surface in successive coats, then drying the spray-painted surface.

2. A process for applying a rubberized paint coating to a plastic surface as defined in claim 1, wherein the diluent contains xylene and cyclohexanone in a combined amount of about 80%.

3. A process for applying a rubberized paint coating to a plastic surface as defined in claim 1, wherein the diluent contains 6.4% methyl isobutyl ketone, 39.1% xylene, 13.4% butylcellosolve, and 41.1% cyclohexanone.

4. A process for applying a rubberized paint coating to a plastic surface as defined in claim 1, wherein the diluent is diluted with the rubberized paint in the proportion of 50%/50%.

5. A process for applying a rubberized paint coating to a plastic surface as defined in claim 1, wherein the spraying step is carried out sufficient to form a rubberized paint coating of a thickness of about 20 microns.

6. A process for applying a rubberized paint coating to a plastic surface as defined in claim 1, wherein a hardener is added to the mixture of rubberized paint and diluent.

7. A process for applying a rubberized paint coating to a plastic surface as defined in claim 6, wherein hardener is added to form a paint mixture of 48.8% rubberized paint, 48.8% diluent, and 2.4% hardener.

8. A process for applying a rubberized paint coating to a plastic surface as defined in claim 1, wherein drying is carried out by forced air drying for about 10 minutes at 35° C.

9. A process for applying a rubberized paint coating to a plastic surface as defined in claim 1, further comprising the additional step after the drying step of wrapping the rubberized paint coated article in tissue paper to avoid dissolving, chipping, scratching, or adhering to the paint surface.

10. A process for applying a rubberized paint coating to a plastic surface as defined in claim 1, wherein the plastic surface is made of ABS plastic.

* * * * *

UNITED STATES PATENT AND TRADEMARK OFFICE
CERTIFICATE OF CORRECTION

PATENT NO. : 5,556,668
DATED : Sept. 17, 1996
INVENTOR(S) : Jenny Y.C. Wong

It is certified that error appears in the above-indentified patent and that said Letters Patent is hereby corrected as shown below:

Title page, item [75],
    In the Name of the Inventor: Please correct the name
to read --Jenny Y.C. Wong--.

Signed and Sealed this

Nineteenth Day of November, 1996

Attest:

BRUCE LEHMAN

*Attesting Officer*      *Commissioner of Patents and Trademarks*